United States Patent
Worthington

(10) Patent No.: US 11,478,862 B1
(45) Date of Patent: Oct. 25, 2022

(54) METHOD AND APPARATUS FOR TOOL HOLDER WITH INCREASED SURFACE AREA

(71) Applicant: Techniks, LLC, Indianapolis, IN (US)

(72) Inventor: Scott Worthington, Flat Rock, IN (US)

(73) Assignee: Techniks, LLC, Indianapolis, IN (US)

( * ) Notice: Subject to any disclaimer, the term of this patent is extended or adjusted under 35 U.S.C. 154(b) by 0 days.

(21) Appl. No.: 17/320,459

(22) Filed: May 14, 2021

(51) Int. Cl.
| | |
|---|---|
| *B23C 5/00* | (2006.01) |
| *B23B 29/04* | (2006.01) |
| *B23B 31/00* | (2006.01) |
| *B23Q 11/12* | (2006.01) |

(52) U.S. Cl.
CPC ............. *B23C 5/006* (2013.01); *B23B 29/04* (2013.01); *B23B 31/006* (2013.01); *B23Q 11/126* (2013.01); *B23B 2231/24* (2013.01); *Y10T 409/30952* (2015.01)

(58) Field of Classification Search
CPC . Y10T 408/94; Y10T 408/95; Y10T 408/957; Y10T 409/30952; Y10T 483/18; B23Q 11/12; B23Q 11/126; B23Q 3/1554; B23Q 2003/155411; B23C 5/006; B23B 29/04; B23B 2231/24; B23B 31/006
USPC .................. 409/234; 408/238, 239 A, 239 R; 483/58
See application file for complete search history.

(56) References Cited

U.S. PATENT DOCUMENTS

| | | | | |
|---|---|---|---|---|
| 3,178,739 A | * | 4/1965 | Plummer | B23G 1/46 408/141 |
| 4,044,845 A | * | 8/1977 | Rumpp | B23B 51/06 175/425 |
| 4,721,423 A | * | 1/1988 | Kubo | B23B 31/117 409/234 |
| 5,234,296 A | * | 8/1993 | Presby | B23B 31/202 409/234 |
| 5,460,388 A | * | 10/1995 | Lewis | B23B 31/202 279/42 |
| 6,599,068 B1 | * | 7/2003 | Miyazawa | B23B 31/006 409/234 |
| 8,459,908 B2 | * | 6/2013 | Cook | B23Q 11/0032 409/234 |
| 2010/0164188 A1 | * | 7/2010 | Madlener | B23B 31/006 279/157 |
| 2017/0173704 A1 | * | 6/2017 | Popp | B23B 31/11 |
| 2018/0141132 A1 | * | 5/2018 | Berg | B23B 31/02 |

FOREIGN PATENT DOCUMENTS

DE   102014211412 B3 * 11/2015 ........... B23B 31/008

* cited by examiner

*Primary Examiner* — Boyer D Ashley
*Assistant Examiner* — Michael Vitale
(74) *Attorney, Agent, or Firm* — Shuttleworth & Ingersoll, PLC; Jason R. Sytsma

(57) ABSTRACT

A textured surface in an outer surface of a tool holding section of a tool holder for increasing a surface area of the outer surface for dissipating heat from the tool holding section. The textured surface can comprise grooves around the outer surface of the tool holding section with a height and a width. Notches can be provided in sides of the grooves to further increase the surface area of the outer surface for dissipating heat from the tool holding section.

13 Claims, 6 Drawing Sheets

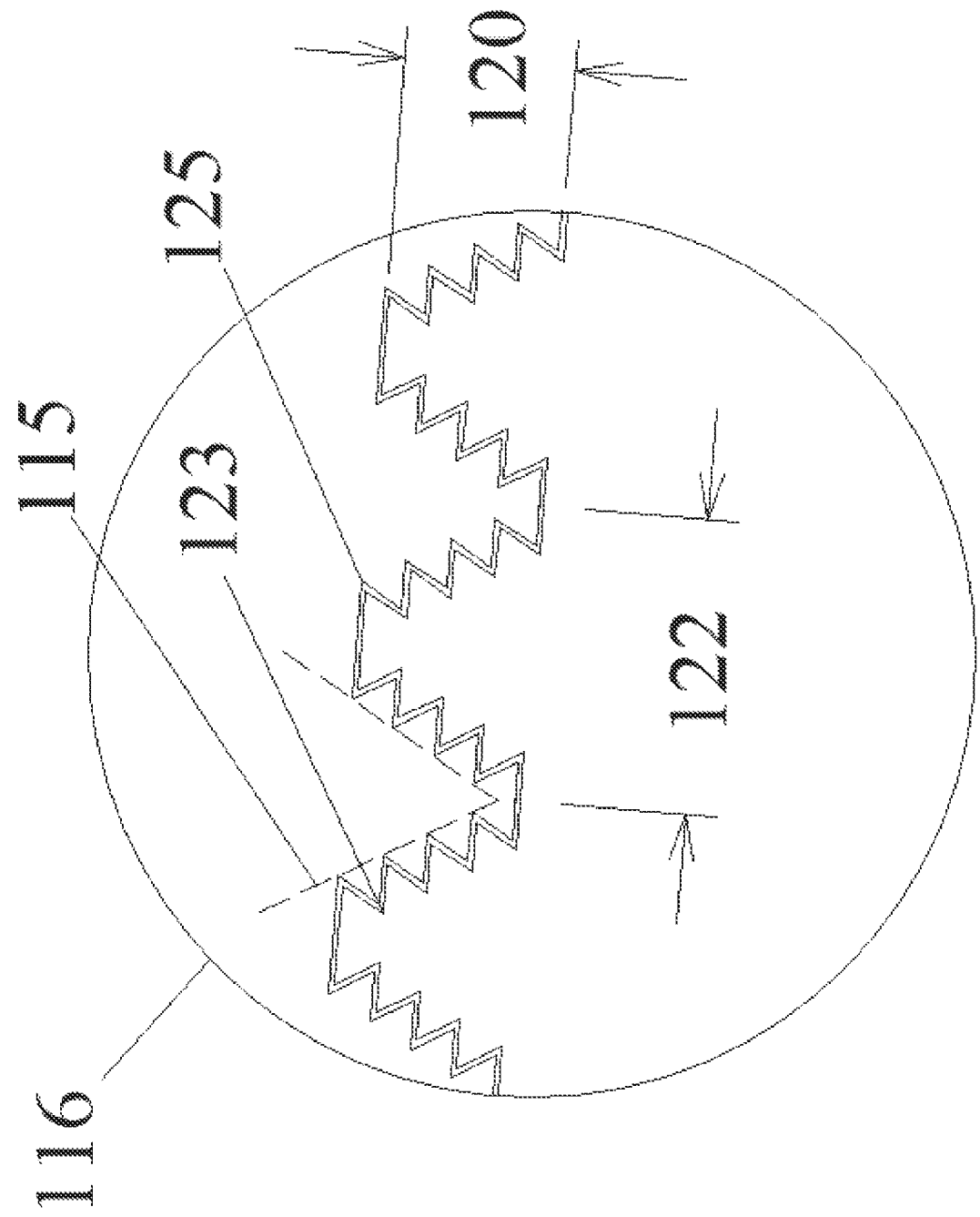

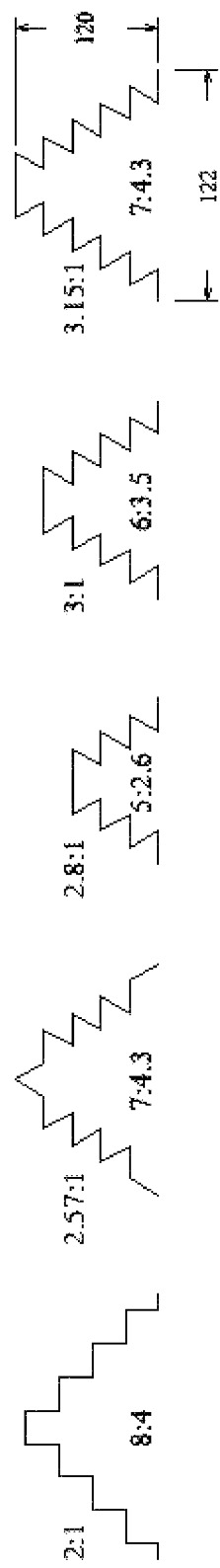

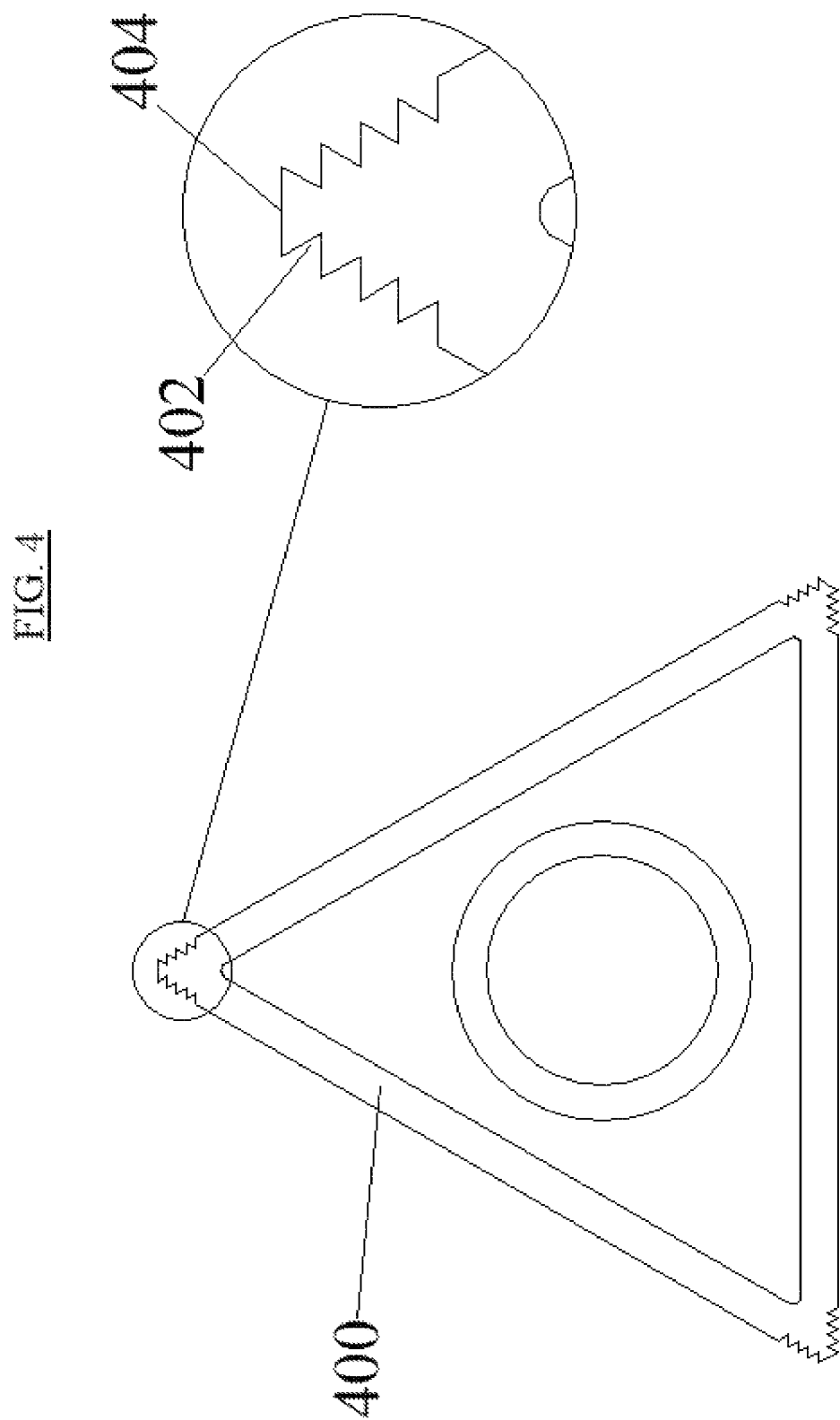

METHOD AND APPARATUS FOR TOOL HOLDER WITH INCREASED SURFACE AREA

TECHNICAL FIELD

This disclosure relates to a tool holder, and more specifically, this disclosure relates to a shrink-fit tool holder with an increased surface around the outer surface of the tool holding section to increase heat during use to prevent heat-related self-release of the tool.

BACKGROUND INFORMATION

A machining center is a computer numerical control (CNC) machining tool with an automatic tool-changing function. The machining center can automatically perform various working such as milling, drilling or notching, boring, tapping, etc. on works set thereto with improved efficiency. A tool holder comprises generally of a tapered portion adapted to be connected to a spindle of a machining center, a manipulator-engaging portion, and a tool holding section for firmly holding the tool.

One type of tool holder is a shrink-fit tool holder, which can firmly hold a tool with excellent dynamic balancing suitable for high-speed work. The shrink-fit tool holder comprises of a tapered connecting portion, a manipulator-engaging portion, and a tool holding section for firmly holding a tool. A shank of the tool is inserted into an aperture of the tool holding section and secured by shrinkage fitting.

The conventional shrink-fit tool holders utilize differences in thermal expansion coefficients between the tool-holding sections and the tool shanks. The tool shanks are made of materials having low thermal expansion coefficients such as sintered carbides, high speed steel, etc., while the tool-holding sections are made of high-expansion materials such as hot work tool steel, nickel-chromium steel, etc.

To prevent slippage or release of the tool from the tool holder during use and to increase the useful life of the tool, coolant is sprayed on to the tool during use. The thermal conduction of carbide, however, is very high while the heat capacity is very low. It is also true that the thermal conduction of carbide is much higher than water or the coolant. This causes heat from the cutting tool to be conducted to the tool holder faster than it can be removed by the coolant. When the tool holder gets too hot, retaining bore expands and the cutting tool begins to slip or release.

Accordingly, there is a need an improved tool holder.

SUMMARY

Disclosed is a tool holder adapted for holding a shank of a tool. The tool holder connects to a machining center and rotates about an axis of rotation to perform is milling action. The tool holder herein described comprises a first section adapted to be connected to the machining center and a tool holding section for receiving and holding the shank of a tool therein. A front face of the tool holding section is perpendicular to the axis of rotation of the tool holding section. A retaining bore extends from the front face into the tool holding section for receiving and holding the shank of the tool therein. The tool holding section has an outer surface concentric with the retaining bore. A textured surface in the outer surface increases a surface area of the outer surface for dissipating heat from the tool holding section.

In an embodiment, the textured surface extends from the front face of the tool holder. The textured surface can comprise grooves around the outer surface of the tool holding section with a height and a width and a ratio for determining a rate of dissipation of heat from the tool holding section. Notches can be provided in sides of the grooves to increase the surface area of the outer surface for dissipating heat from the tool holding section.

In yet another embodiment, the textured surface can comprise of a material having a Young's modulus greater than a Young's modulus of the outer surface of the tool holder at least partially embedded in the outer surface of the tool holder. The material can comprise of a particle structure selected from a group comprising diamond, aluminum oxide, silicon carbide, boron carbide, synthetic sapphire, garnet, cerium oxide, silica, and osmium.

In further embodiments, in order to improve dissipation of heat from the tool holding section, a coating can be placed over the textured surface.

BRIEF DESCRIPTION OF THE DRAWINGS

These and other features and advantages of the present invention will be better understood by reading the following detailed description, taken together with the drawings wherein:

FIG. 2A is a close-up view of a first embodiment of a textured surface on the outer surface of the tool holding section.

FIG. 3 shows alternative texture patterns for the outer surface of the tool holding section.

FIG. 4 shows an exemplary cutting tool for forming the textured surface of FIG. 2A.

DETAILED DESCRIPTION OF THE PREFERRED EMBODIMENTS

Figure 1:
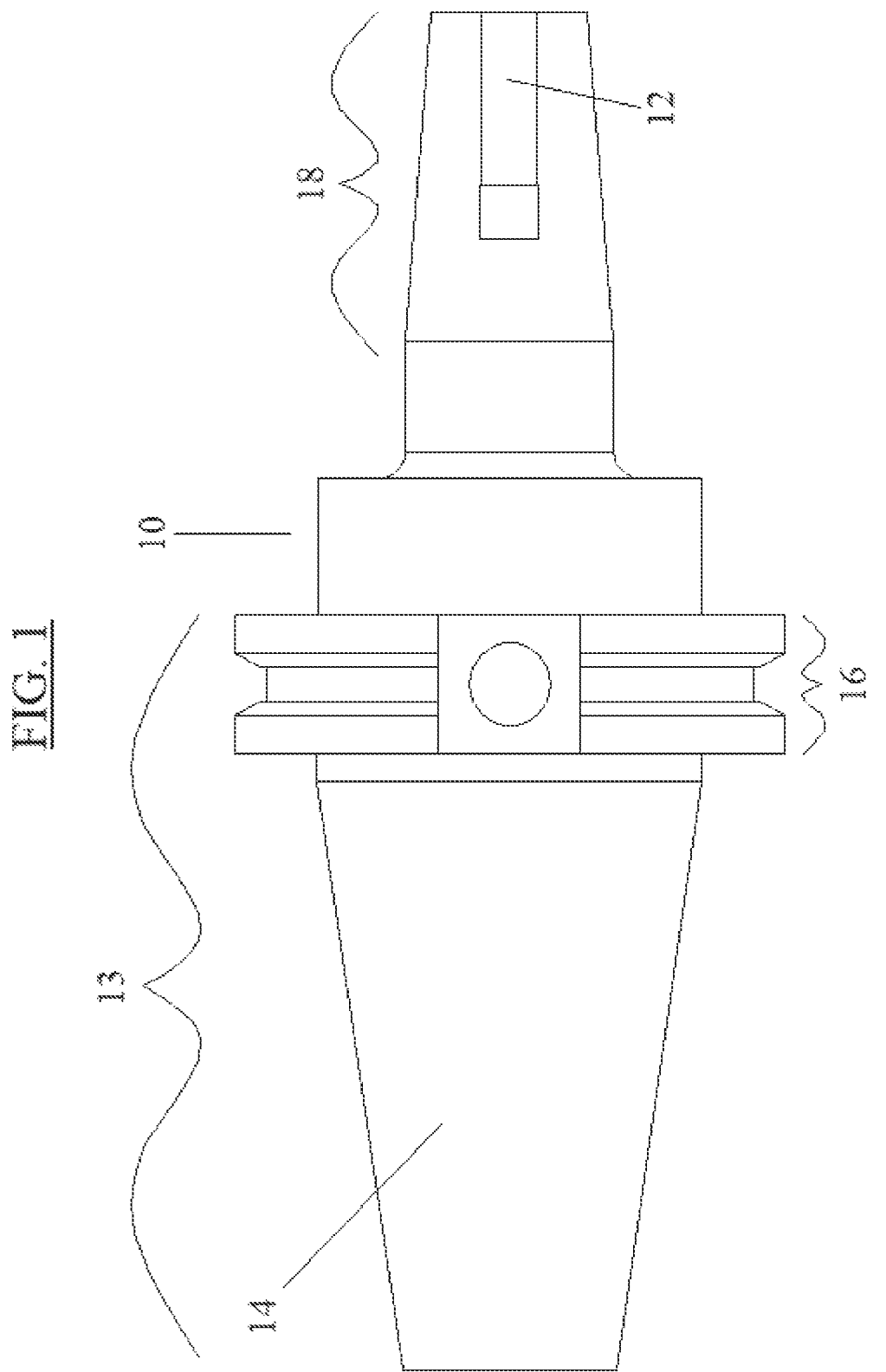
FIG. 1 is a partial cross-sectional side view of a tool holder with a shrink-fit bore according to the prior art.

Referring to FIG. 1, disclosed is a tool holder 10 with a retaining bore 12 that can be shrink-fit onto a tool according to the prior art. Tool holder 10 comprises of a first section 13 adapted to be connected to a machining center (CNC). This first section 13 can include a tapered connecting portion 14 configured to be received by a CNC machine (not shown) and a manipulator-engaging portion 16 is designed to be engaged by a clamping system in the CNC machine to hold firmly tool holder 10 to the CNC machine spindle. A tool holding section 18 can firmly hold a tool to the tool holder 100. A shank of the tool is inserted into bore 12 of tool holding section 18 and secured by shrink fitting. Tool holding section 18 has a smooth outer surface area with a taper from the front face toward the back of tool holding section 18 giving it a smaller diameter at the front. Consequently, heat from the cutting tool is conducted to the tool holder 10 faster than it can be removed by the coolant. When tool holder 10 gets too hot, retaining bore 12 expands and the cutting tool begins to slip or release.

Figure 2:
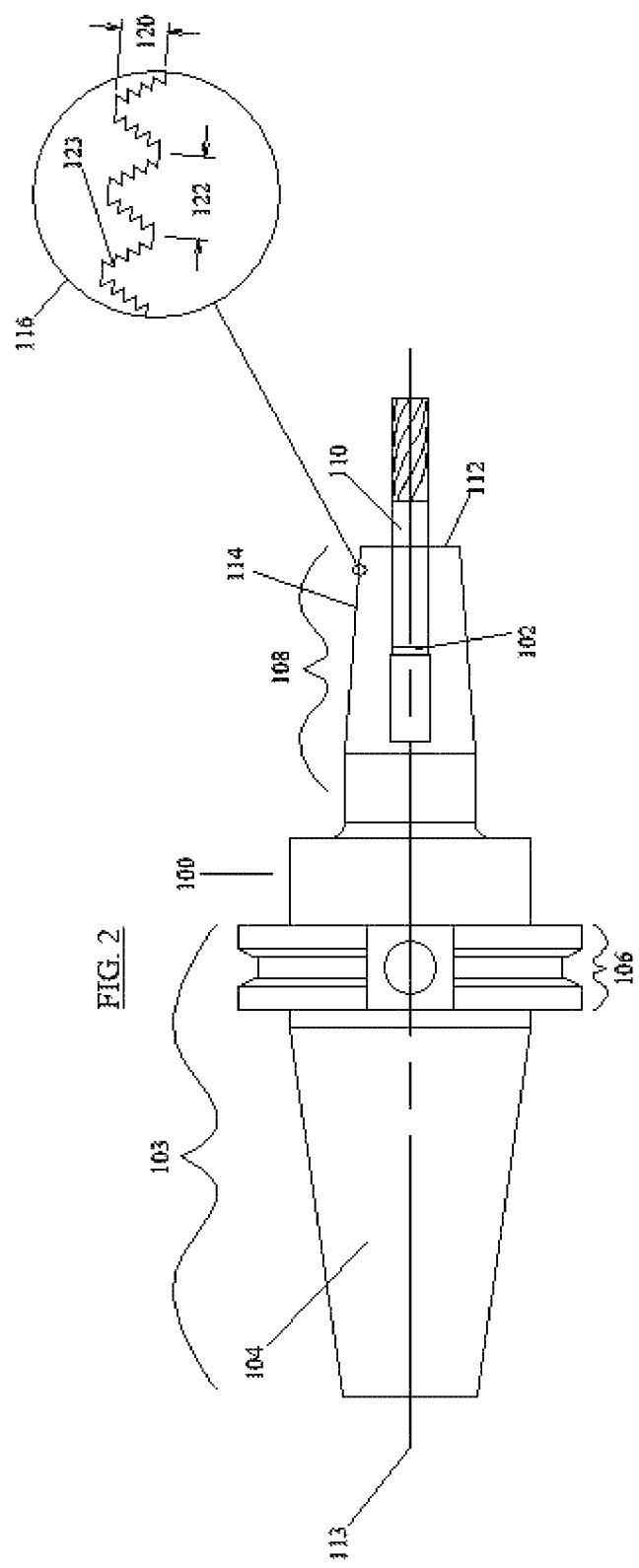
FIG. 2 is a side view of the tool holder according to this disclosure.

FIG. 2 shows a tool holder 100 according to this disclosure. Tool holder 100 comprises of a first section 103 adapted to be connected to a machining center (CNC). This first section 103 can include a tapered connecting portion 104 configured to be received by a CNC machine and a manipulator-engaging portion 106 designed to be engaged by a clamping system in the CNC machine to hold firmly tool holder 100 to the CNC machine spindle. A tool holding section 108 comprising a retaining bore 102 can receive and secure the shank of the tool by shrink fitting.

More specifically, tool holding section 108 comprises of a front face 112 perpendicular to an axis of rotation 113 of tool holding section 108. Retaining bore 102 extends from front face 112 into tool holding section 108 for receiving and holding a shank of tool 110 therein. Tool holding section 108 comprises of an outer surface 114 concentric with retaining bore 102. Outer surface 114 comprises of a textured surface 116 for increasing a surface area of outer surface 114 for dissipating heat from tool holding section 108. The surface area of outer surface 114 is directly related to the rate of radiant and convective heat loss. By increasing the surface area of outer surface 114, the rate of radiant and convective heat loss is increased.

Textured surface 116 can extend adjacent from front face 112 up outer surface 114. Front face 112 can similarly comprise textured surface 116. Textured surface 116 can comprise a wide variety of textures. In an embodiment, as shown in FIG. 2A, textured surface 116 comprises of grooves 118 around outer surface 114 of tool holding section 108. Grooves 118 around the outer surface can comprise a height 120 and a width 122 with a defined ratio of width to height depending on the amount of increased surface area that is desired. Referring to FIG. 3 are examples of textured surface 116 where the ratio of height 120 to width 122 can be, for example, from left to right, 2:1, 2.57:1, 2.8:1, 3:1, 3.15:1. Any ratio more, less or in between any of those ratios can be designed.

Grooves 118 cut into outer surface 114 of tool holding section 108 are defined by nominal surfaces 115. Textured surface 116 can additionally have notches 123 formed in nominal surfaces 115 to increase the surface area. These notches 123 can be formed with grooved cutting tools, an example of which is shown in FIG. 4. Referring back to FIG. 2A, textured surface 116 is shown with a plurality of notches 123 cut into nominal surfaces 115 on the positive and negative rise of grooves 118. Referring back to FIG. 3, shown are several examples of notches 123 cut into nominal surfaces 115 of grooves 118 of outer surface 114 for creating textured surface 116. This additional surface area created by notches 123 can increase the surface area in any defined ratio compared to a flat positive and negative slope of groove 118 imagined by a straight line from valley to valley of each groove 118 (i.e., nominal surfaces 115). The ratios for the examples shown in FIG. 3, from left to right, are, as follows: 8:4, 7:4.3, 5:2.6, 6:3.5, and 7:4.3. Any ratio more, less or in between any of those ratios can be designed.

FIG. 4 shows an example of a cutting tool 400 used to form textured surface 116 with notches 123 in the sides of grooves 118. A standard cutting tool with a 60 degree angle can be used to cut grooves with flat positive and negative rises on the sides of grooves 118. These tools create smooth surfaces. FIG. 4 shows cutting tool 400 with grooves 402 cut into the cutting edge 404 of cutting tool 400. These grooves 402 allow for the formation of complex notches 123, such as those shown in FIG. 3.

Outer surface 114 can remain smooth to the touch notwithstanding the formation of textured surface 116 thereon. A valley to valley segment length of 0.001 inches is more difficult to make but will be quite smooth to the touch. A valley to valley segment length of 0.030 inches will be easier to make but will feel like a worn out file.

In another embodiment, as shown in FIG. 2B, textured surface 116 comprises of a material 124 having a Young's modulus greater than a Young's modulus of outer surface 114 of tool section 108 at least partially embedded in outer surface 114 of tool holding section 108. In such an embodiment, material 124 can comprise of a particle structure comprising diamond, aluminum oxide, silicon carbide, boron carbide, synthetic sapphire, garnet, cerium oxide, silica, or osmium. In such embodiments, material 124 is embedded into outer surface 114.

Figure 5:
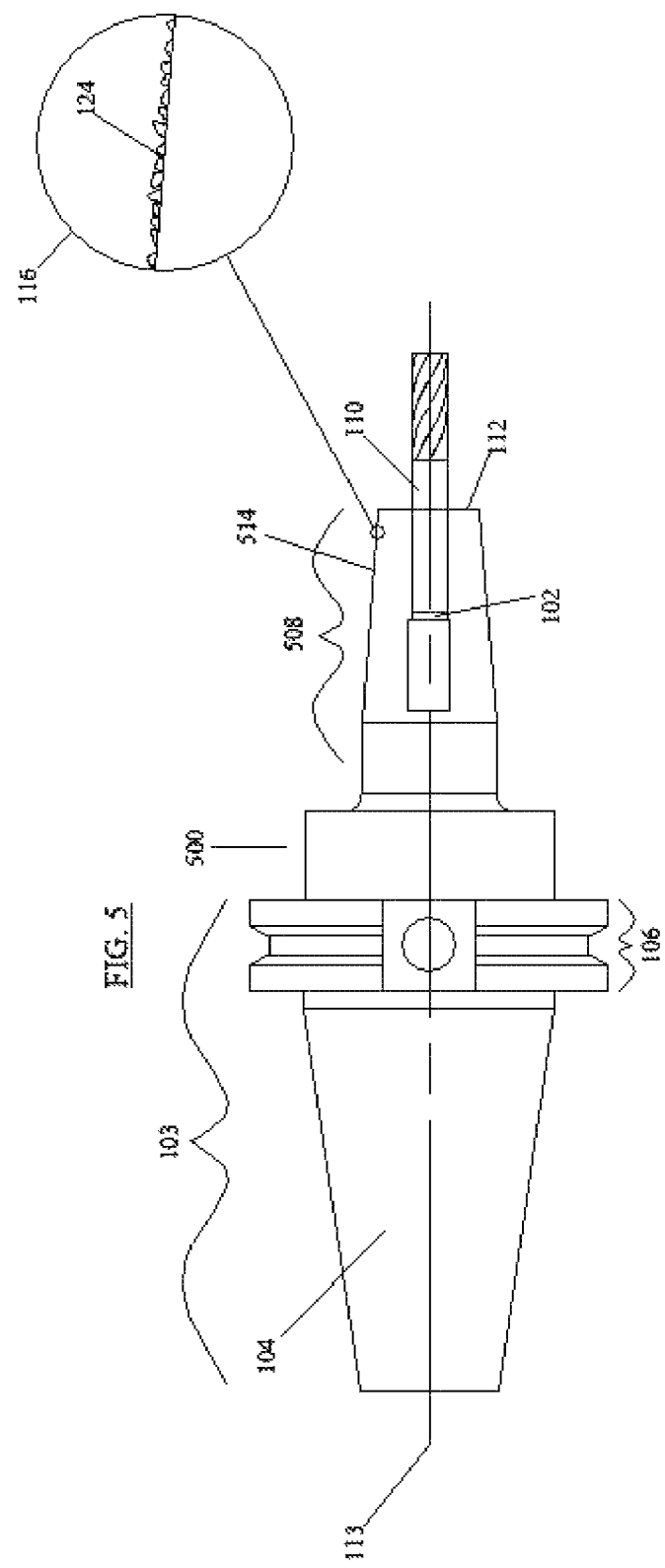
FIG. 5 is a side view of the tool holder of another embodiment according to this disclosure.

FIG. 5 shows a tool holder 500 similar in operation to tool holder 100 but with material 124 embedded in outer surface 514 of tool holding section 508. Material 124 can be embedded into outer surface 514 by pressing material 124 into outer surface 514 by super heating tool holding section 508 and pressing material 124 into outer surface 514 or by super cooling tool holding section 508 and placing it in a cavity with material 124 so that as it cools and expands back to its normal size, the expansion pressure of tool holding section 508 presses material 124 into outer surface 514.

In yet another embodiment, textured surface 116 is created by chemically etching or laser etching outer surface 114.

To further improve dissipation of heat from tool holder 100, tool holding section 108 can comprise a black coating 125. Black coating 125 can be applied in a relatively thick layer around tool holding section 108 with textured surface 116 added therein. Alternatively, textured surface 116 can be added, as described above, with black coating 125 added as a relatively thin layer so as to not fill in textured surface 116. Black coating 125 could also be added in the laser etching process. One skilled in the art will recognize that black coating 125 can by any gradation of black or dark or opaque coloration.

Black coating 125 can be any material but preferably has a thermal conductivity similar to steel. Examples of such coatings, include black oxide or phosphate conversion, chemical vapor deposition, or physical vapor deposition coatings.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A tool holder comprising a first section adapted to be connected to a machining center and a tool holding section for receiving and holding a shank of a tool therein, the tool holding section comprising:

a front face that extends perpendicular to an axis of rotation of the tool holding section;

a retaining bore extending from the front face into the tool holding section for receiving and holding the shank of the tool therein with a working end of the tool extending from the front face; and an outer surface concentric with a portion of the retaining bore where the shank of the tool is held, the outer surface being a textured surface for increasing a surface area of the outer surface for dissipating heat from the tool holding section, wherein the textured surface comprises of a plurality of grooves cut into the outer surface of the tool holding section with each groove being defined by nominal surfaces with a plurality of notches cut into the nominal surfaces of each groove of the plurality of grooves.

2. The tool holder of claim 1, wherein the textured surface extends from the front face of the tool holder.

3. The tool holder of claim 1, wherein the grooves formed within the outer surface comprise a height and a width.

4. The tool holder of claim 3, wherein the height and the width of the grooves comprise a consistent ratio for determining a rate of dissipation of the heat from the tool holding section.

5. The tool holder of claim 4, wherein the consistent ratio of the depth and the width of the grooves for determining the rate of dissipation of the heat from the tool holding section is one of 8:4, 7:4.3, 5:2.6, 6:3.5, and 7:4.3.

6. The tool holder of claim 1, the tool holder further comprising a coating over the textured surface to improve dissipation of the heat from the tool holding section without filling in the textured surface.

7. The tool holder of claim 6, wherein the coating is a black coating over the textured surface.

8. A tool holder adapted for holding a shank of a tool therein, for rotating about an axis of rotation, and for connecting to a machining center, the tool holder comprising:
- a first section adapted to be connected to the machining center;
- a tool holding section for receiving and holding the shank of the tool therein,
- a front face of the tool holding section that is perpendicular to the axis of rotation of the tool holding section;
- a retaining bore extending from the front face into the tool holding section for receiving and holding the shank of the tool therein with a working end of the tool extending out from the front face;
- an outer surface concentric with a portion of the retaining bore where the shank of the tool is held, the outer surface being a textured surface for increasing a surface area of the outer surface for dissipating heat from the tool holding section, wherein the textured surface comprises of a plurality of grooves cut into the outer surface of the tool holding section with each groove being defined by nominal surfaces with a plurality of notches cut into the nominal surfaces of each groove of the plurality of grooves.

9. The tool holder of claim 8, wherein the textured surface extends back from the front face of the tool holder.

10. The tool holder of claim 8, wherein the grooves formed within the outer surface comprise a height and a width with a ratio for determining a rate of dissipation of the heat from the tool holding section.

11. The tool holder of claim 10, wherein the ratio of the depth and the width of the grooves for determining the rate of dissipation of the heat from the tool holding section is one of 8:4, 7:4.3, 5:2.6, 6:3.5, and 7:4.3.

12. The tool holder of claim 8, the tool holder further comprising a coating over the textured surface to improve dissipation of the heat from the tool holding section without filling in the textured surface.

13. The tool holder of claim 12, wherein the coating is a black coating over the textured surface.

* * * * *